United States Patent [19]
Richarme

[11] 3,910,704
[45] Oct. 7, 1975

[54] COMPENSATING DEVICE FOR SIGHTING INSTRUMENTS

[75] Inventor: Victor Louis Paul Richarme, Paris, France

[73] Assignee: Essilor International, Le Pont, France

[22] Filed: Mar. 12, 1974

[21] Appl. No.: 450,482

[30] Foreign Application Priority Data
Mar. 13, 1973 France .............................. 73.08943

[52] U.S. Cl. .................................. 356/249; 350/16
[51] Int. Cl.² .......................................... G01C 9/18
[58] Field of Search ....... 356/249, 247; 350/16, 286

[56] References Cited
UNITED STATES PATENTS

| | | |
|---|---|---|
| 2,386,621 | 10/1945 | Luboshez ............................ 356/249 |
| 2,876,673 | 3/1959 | Hamilton ............................ 356/249 |
| 3,044,343 | 7/1962 | De Fontguyon .................... 356/249 |
| 3,520,621 | 7/1970 | Blesch et al. ....................... 356/249 |
| 3,583,814 | 6/1971 | Shumway, Jr. ...................... 356/249 |

*Primary Examiner*—Vincent P. McGraw

[57] ABSTRACT

This invention provides a compensator for optical instruments such as automatic levels, which comprises a liquid sheet having a permanently horizontal surface and associated with a reflecting system imparting to the incident light beam an even number of reflections between the point of penetration of the light beam into the reflecting system and the liquid sheet, said beam, after passing a first time through said sheet, being caused to pass again therethrough subsequent to a total reflection on the permanently horizontal surface of said liquid sheet.

7 Claims, 10 Drawing Figures

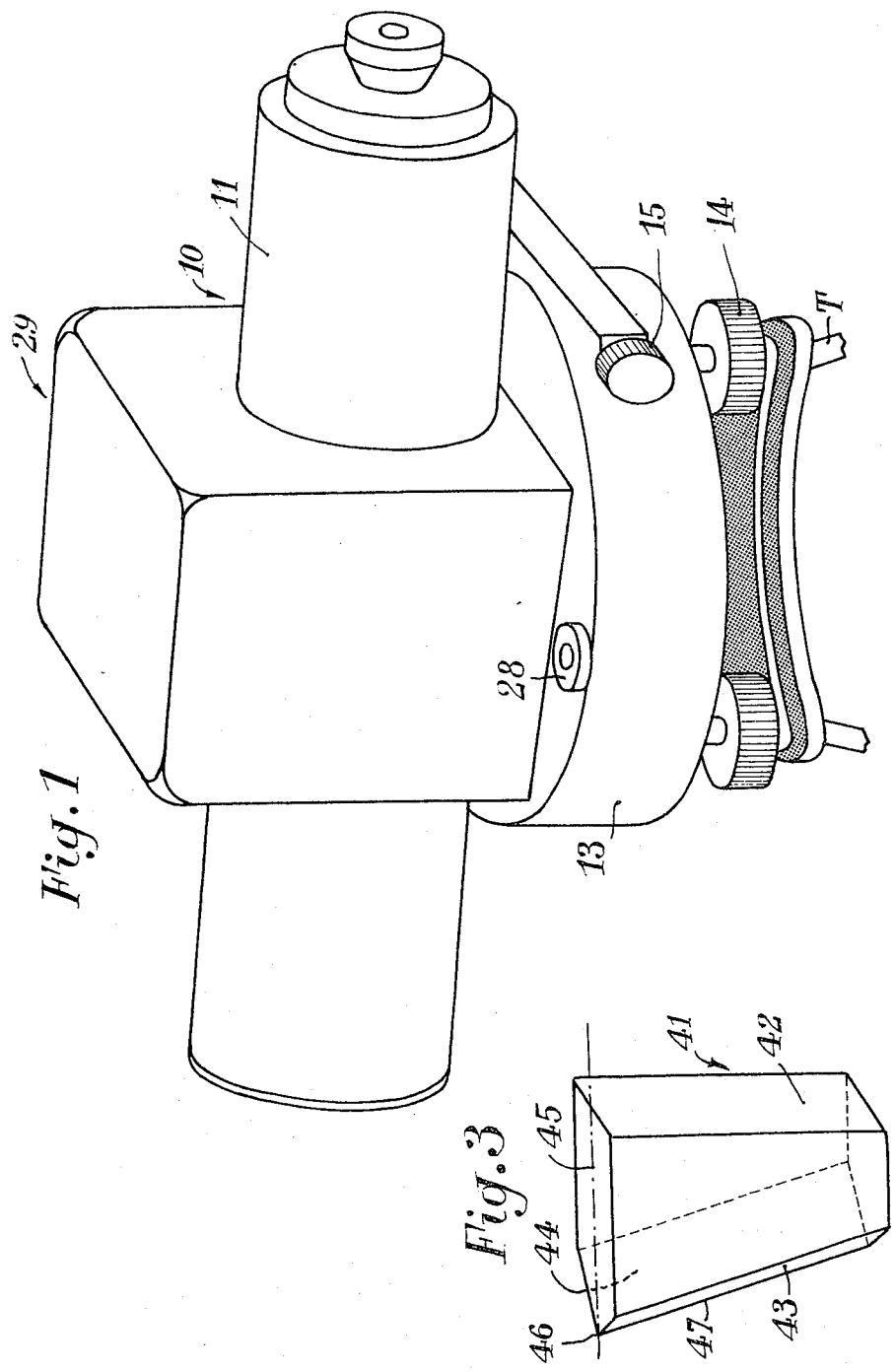

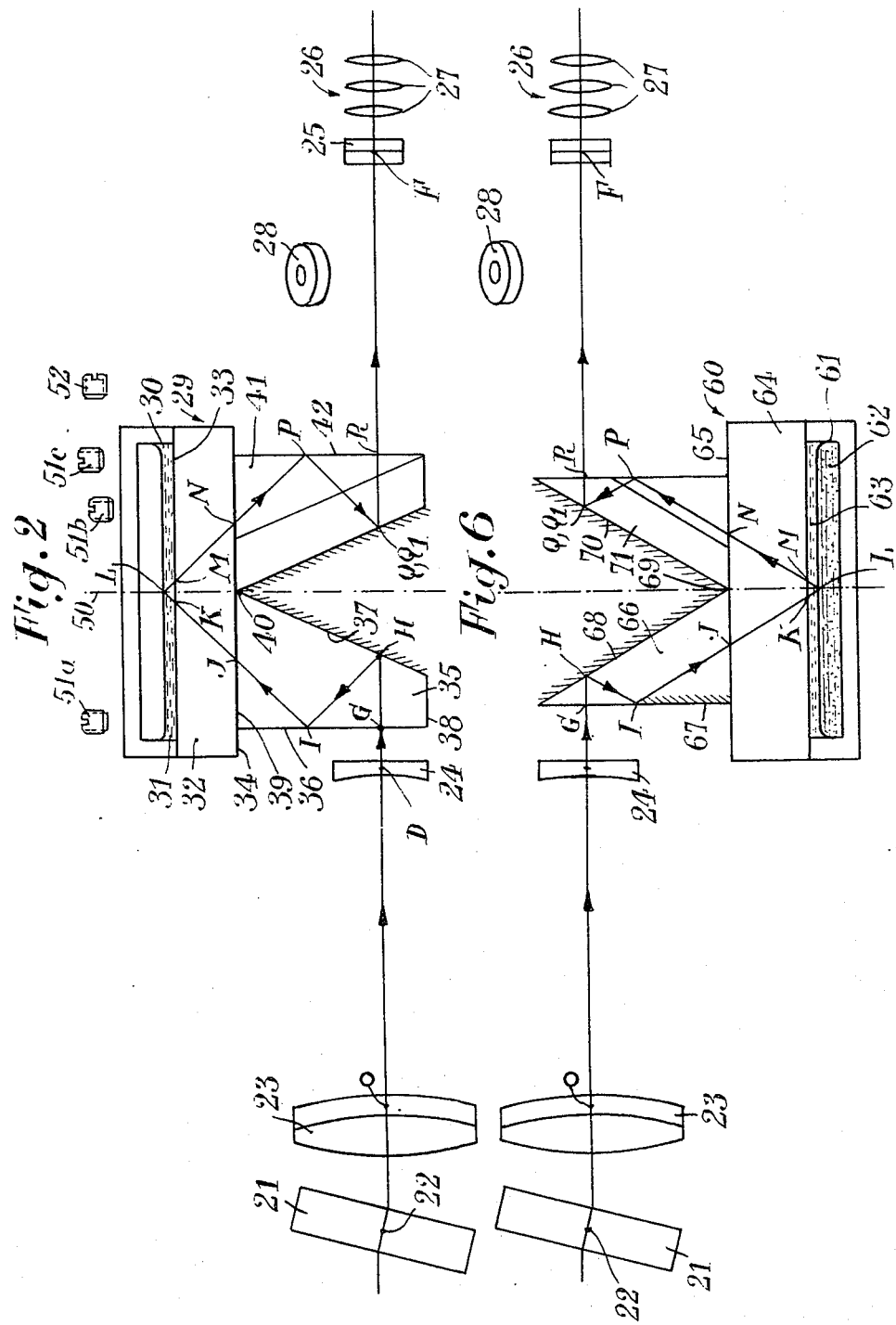

COMPENSATING DEVICE FOR SIGHTING INSTRUMENTS

FIELD OF THE INVENTION

The present invention relates in general to sighting instruments, and more particularly to a device for compensating the non-linearity of optical instruments, notably levels, and also to such optical instruments, notably levels, incorporating this compensating device.

DESCRIPTION OF THE PRIOR ART

Levels (i.e., instruments used for determining the difference in height between two points, or more particularly for measuring by horizontal geometrica levelling, with the assistance of a graduated sight the individual altitudes of successive topographic points) are well-known which comprise a sighting-piece (mostly a sighting telescope incorporating a objective, an internal focusing divergent lens, a reticle and an eyepiece) combined with a toroidal tube or air bubble level containing a liquid reserving an air bubble for adjusting the instrument to the proper horizontal setting by bringing said bubble to a central podition between limit marks of said tube by means of one or more adjustment members of said sighting-piece, notably an elevation or tilting screw thereof.

So-called "automatic" levels have already been proposed wherein the horizontality of the line of sight is obtained nearly immediately by simply erecting, and coarsly adjusting the horizontality of the sighting-piece, by means of a small spherical air bubble level. These automatic levels incorporate a so-called compensating device which, by deflecting the path of the light beams penetrating into the sighting-piece, cause said beams to converge towards the horizontal line at the centre of the reticle, irrespective of the direction of the sighting-piece body with respect to the horizontal within proper limits of angular divergence from the horizontal.

In know automatic levels of this type the compensator consists mainly of a pendulum to which an optical device capable of deflecting the path of the light beam is attached, a frictionless oscillation damping device being provided for reducing the oscillation time of the pendulum and therefore the time elapsing from the moment the instrument is set for operation and the beginning of the sighting operation proper. However, pendulum compensators are attended by various drawbacks, notably an insufficient precision due to frictional contacts in the suspension of the pendulum, a fragility due to the specific type of mechanical elements implemented, a high cost due to the difficult manufacture of these elements, so that land-surveyors and topographers are more inclined to use conventional air bubble level instruments than automatic instruments, in spite of the considerable advantages resulting from the use of automatic levels.

SUMMARY OF THE INVENTION

More generally, it is a specific object of the present invention to provide a compensating device for sighting-pieces, and a sighting instrument incorporating such compensator, notably an automatic level, which are definitely free of the above-mentioned inconveniences characterising hitherto known instruments of this kind.

With this object in view, the present invention is directed primarily to provide a compensator and an optical instrument equipped with such a compensating device which is free of any movable mechanical part, whereby on the one hand a high degree of precision not limited by friction effects and on the other hand a high degree of reliability are obtained.

It is a further object of this invention to provide a compensator and an optical instrument of the type broadly set forth hereinabove and equipped with this compensator, which are both constructionally simple and consequently economical to manufacture.

It is a complementary object of this invention to provide an automatic level in which the objective or lens system and the eyepiece are aligned in relation to the instrument axis, whereby the body of the instrument is of elongated configuration in contrast to hitherto known automatic levels frequently of the periscope type which must provide space for housing the compensator pendulum.

It is an additional object of this invention to provide a straight-image level which is consequently easy to operate while providing a magnification sufficient for making accurate topographic surveys.

Finally, it is a further object of the present invention to provide a fully-automatic level, i.e., such that, after a coarse adjustment of the horizontal position of the sighting-piece axis, the horizontal position of the line of sight is obtained without any handling or manoeuvre whatsoever.

A compensating device according to this invention is characterised in that it comprises a liquid sheet having a surface remaining constantly horizontal, to which a reflecting system is associated, this reflecting system imparting to the light beam between the point of penetration of light beam into the reflecting system and the liquid an even number of reflections, whereby said light bean, after passing a first time through said liquid sheet, passes again there through subsequent to a total reflection either under the constantly horizontal surface of said liquid sheet or on a liquid reflecting surface in interface relationship with the constantly horizontal surface of the liquid sheet.

This invention is also directed to provide an automatic level comprising a sighting-piece having an objective, a reticle and an eyepiece-type, characterised in that it further comprises a compensator of the type broadly set forth hereinabove, said compensator being disposed between the objective and the reticle at such a distance from said reticle that the length $l$ of the optical path of the light beam between the centre of said liquid sheet or on the liquid reflecting surface in interface relationship there with is equal, for infinity focusing, to $f/x$, $f$ designating the focal length of the objective and $x$ a constant depending on the indices of refraction of the liquid sheet and of the material constituting the reflecting system, and also on the geometrical arrangement of the compensator.

In a particularly advantageous embodiment of a level according to this invention, $$l = \frac{f}{2n},$$

in which $f$ has the same meaning as above and $n$ designates the common value of the retractive index of the liquid sheet and of the refractive index of the material constituting the reflecting system.

A clearer understanding of this invention will be had as the following description proceeds with reference to the accompanying drawings, in which:

BRIEF DESCRIPTION OF THE DRAWINGS

FIG. 1 is a general perspective view of a level according to this invention;

FIG. 2 is a diagram of a level according to a first embodiment of this invention;

FIG. 3 is a perspective view showing one portion of the instrument illustrated diagrammatically in FIG. 2;

FIG. 6 is a diagrammatic view similar to FIG. 2 but showing a modified embodiment of the level according to this invention;

DESCRIPTION OF THE PREFERRED EMBODIMENTS

Figure 4:
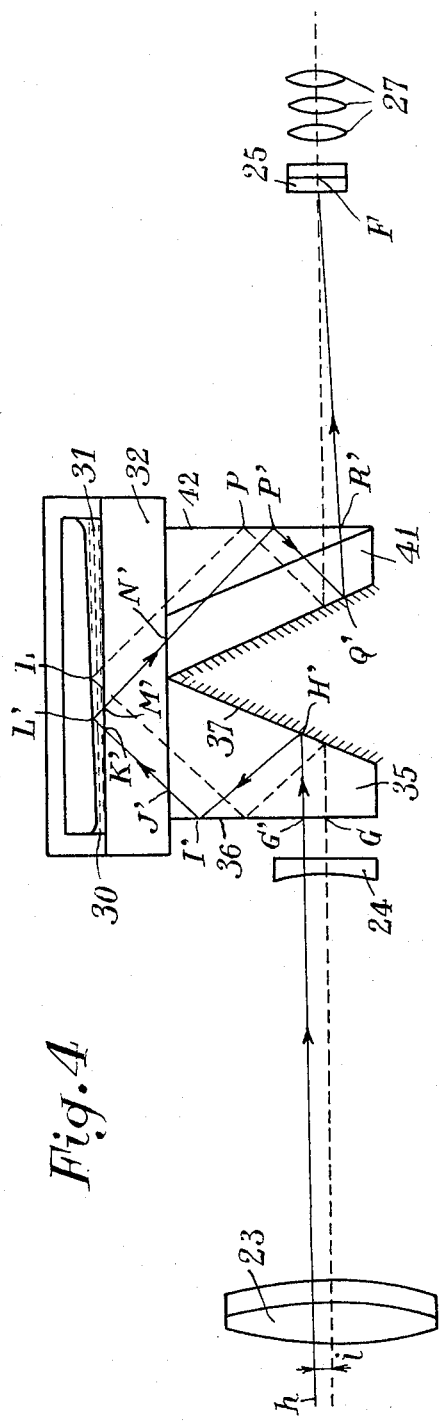
FIG. 4 is another diagram illustrating the operation of the instrument shown in FIG. 2.

An automatic level 10 according to this invention (FIG. 1) comprises a sighting-piece or sighting-telescope 11 mounted on a base plate 13 adapted to be secured to a tripod T or like member with the interposition of adjustment screws 14 and an orientation clamp screw 15. Secured to the plate 13 is a small spherical bubble level 28 for the coarse adjustment of the horizontal position of the level sighting axis by means of the adjustement screws 14. The sighting-piece 11 shown in FIG. 2 comprises:

a parallel-face flat transparent plate 21 receiving the incoming or incident light beam r, which is pivotally mounted about a horizontal axis 22 this plate 21 acting as an optical micrometer for the accurate measurement of division lines or graduations of a topographic staff or lavelling pole, this function being particularly advantageous in the case of telescopes producing a considerable magnification. However, this plate may be dispensed with in the case of telescopes of relatively low optical power;

a teleobjective or tele-lens with a variable focal length $f$ comprising a first or objective section 23 made of two or more lenses, followed by a second section 24 comprising a single lens or a pair of lenses cemented to each other this second section being axially movable so that a sharp pole image can be obtained as a function of its distance from the level;

a sighting-line reticle 25, and behing this reticle, at the light beam outlet end of the sighting-piece, an eyepiece 26 comprising a lens system 27.

According to this invention, a compensating device 29 is disposed between the objective section 24 and reticle 25. In a first embodiment, this compensating device 29, as shown in FIGS. 2 and 4, comprises a liquid cup 30 partially filled with a liquid having an index of refraction $n'$ and constituting a sheet 31. A parallel-faced plate 32 of a material having an index of refraction $n$ is coupled to the bottom 33 of said cup 30. A pair of prisms 35 and 41 are cemented to the face 34 of plate 32 which is opposite the face cemented to the bottom 33 of said cup. The first prism 35 having an index of refraction $n$ is right-angled, with a trapezoidal longitudinal vertical section. The prism face 36 receiving the light beam is perpendicular to the face 34 of plate 32. The first prism 35 has a metal-coated hypotenuse face 37 forming with said face 36 an angle of about 22°30′. The dihedron formed by faces 36 and 37 is truncated by a face 38 parallel to the face 39 cemented to the parallel-faced plate 32. The face 39 of prism 35 coyers substantially one-half of the length of said cup 30, measured in a parallel direction to the direction of incidence of the light beam, so that the prism edge 40, at the intersection of the hypetenuse face 37 and face 39, lies substantially in the plane of symmetry of cup 30 perpendicular to the incidence direction of the light beam.

The second prism 41 is made of the same material as that constituting the first prism 35 and plate 32. As shown in FIG. 3, this second prism 41 has an outlet face 42 for the light beam which is substantially perpendicular to the face 34 of plate 32 with, opposite this face 34, two faces 43 and 44, advantageously metal-coated, at right angles to each other along an edge 47, the prism section taken in its longitudinal plane of symmetry 45 being the same as that of the first prism 35. The apex 46 of edge 47, on the face 43 of plate 32, engages the edges 40 of prism 35.

The cup 30, the parallel-faced plate 32 and prisms 35, 41 constitue unitary assembly having a centre line 50. This assembly is so mounted in the sighting-piece 11 that its vertical and angular positions in relation to the vertical axis of rotation of the instrument, can be adjusted by turning the screws 51a, 51b and 51c. This assembly is also mounted to permit its displacement in the direction of the longitudinal axis of the sighting-piece by actuating an other adjustment screw 52. Means (not shown) are further provided for rotating the compensating assembly through half a revolution about said centre line or axis of symmetry 50, the prism 41 then constituting the input prism for the light beam, and prism 35 the output prism.

This instrument operates as follows:

Assuming that the sighting-piece 11 is perfectly horizontal, a horizontal beam $r$ penetrating into it will pass firstly through the nodal point O of objective 23 (possibly after undergoing a translation in the optical micrometer 21), then through the divergent lens or lenses 24 at point D, and into the prism 35 at point G. After being reflected at point H by the hypotenuse face 37, the light beam undergoes a total reflection at point I on the input face 36 if the index of refraction $n$ of the material constituting said prism 35 is so selected that the limit angle of total refraction is less than 45°, this value being that of the angle of incidence at point I, i.e., if the index $n$ exceeds 1.414, a requirement constantly met with optical classes having refractive indices not below 1.45. After its total reflection at point I on the face 36 of prism 35 (FIG. 2), the light beam emerges from the face 39 of said prism at point J, thus forming an angle of 45° with the incident beam ODG. Then the light beam passes through the parallel-faced plate 32 and emerges therefrom at point K where it is refracted while changing from the having a refractive index $n$, i.e.

the common refractive index of the prism and of the parallel-faced plate, to the medium having a refractive index $n'$ which is that of the liquid 31 contained in cup 30. This liquid 31 is selected to have a refractive index higher than 1.414. Therefore, the light beam undergoes a total reflection at point L under the free constantly horizontal face of the liquid sheet 31, passes again through this liquid sheet between points L and M, and penetrates into the parallel-faced plate 32. As it emerges from this plate 32, at N, the light beam penetrates into the prism 41 in which, after a total reflection at point P on the outlet face 42 of this prism, is reflected twice at Q and $Q_1$ on the dihedral or roof-shaped faces 43 and 44, and finally emerges from said prism at point R of its face 42 and forms at F, centrally of the reticle 25, a straight image due to its successive reflections at H, I, L, P and Q, $Q_1$.

With prisms 35 and 41 having strictly the angular values given hereinabove, and provided that the operative faces of plate 32 are exactly parallel to each other, the beam RF emerging from prism 41 is exactly parallel to the incident beam OD.

The same occurs if the deflection introduced by the prism 35 departs from 45°, provided that the number of reflections of the light beam in said prism be an even number and that the angles of reflection at points I and L be smaller than the angle corresponding to a total reflection, which is of the order of 41°48 for a medium having a refractive index of 1.5.

When the axis of sighting-piece 11 is inclined to the horizontal by an angle $i$, as exemplified in FIG. 4, the horizontal light beam $h$ passing through the virtual rear nodal point of the teleobjective penetrates into the prism 35 at point G' and, since this incident beam is not perpendicular to the input face 36 of said prism, it is refracted along a path G'H' which, by reflection on the reflecting face 37, will provide a beam H'I' which, after a total reflection on face 36 at point I', will emerge from the prism at joint J', then pass through the parallel-faced plate 32 between points J' and K', where it penetrates into the liquid sheet 31 in cup 30, so as to be refracted along a path K'L'. At point L' of the free surface of liquid sheet 31 the light beam undergoes a total reflection and again is caused to pass through the liquid sheet 31 (forming a liquid prism) between points L' and M', and thereafter penetrates into the parallel-faced plate 32 in which it is again refracted. As it emerges from this plate 32 at N', the light beam penetrates into the prism 41 where it undergoes a total reflection at P' on the outlet face 42 of this prism, whereafter the beam is reflected at Q' and emerges from face 42 of prism 41 at point R', where it is again refracted.

If, according to a feature of this invention, the compensator is disposed between the teleobjective 23, 24 and the reticle 25, so that the length $l$ of the optical path from point F of the reticle to point L where the light beam undergoes a total reflection under the free face of liquid sheet 31, is equal, for infinity focusing, to:

$$l = \frac{f}{2\sqrt{2n'^2 - n^2}} \quad (I)$$

wherein $f$ designates the focal length of the teleobjective comprising the objective 23 and the divergent lens or lenses 24, then the light beam refracted at R' by the output face 42 of prism 41 will pass through point F of reticle 25.

Figure 5:
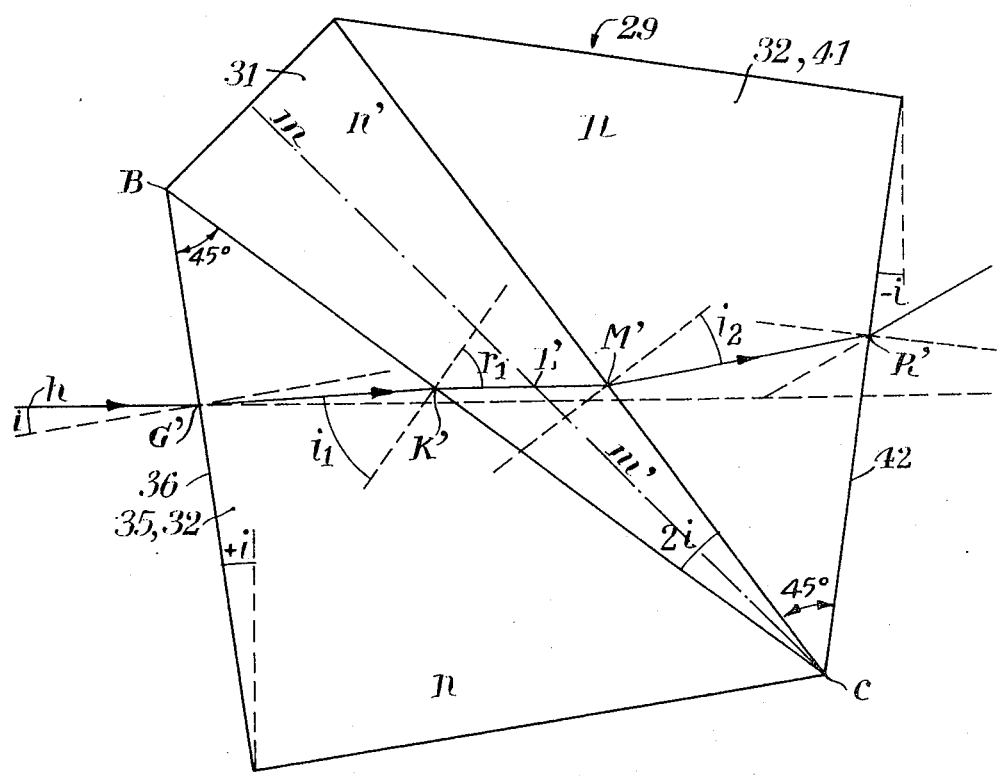
FIG. 5 is a diagrammatic view illustrating the method of calculating the deflection produced by the compensator.

In fact, as shown in FIG. 5 illustrating the diagram of the optical path developed through the compensator 29:

the prism 35 and the parallel-faced plate 32 are equivalent, from the optical point of view, to a prism having a refractive index $n$, an apex angle B = 45° and receiving on its input face 36 a light beam $h$ passing through the virtual rear nodal point of the teleobjective 23, 24;

the liquid sheet 31 is on the other hand the equivalent on the one hand to a prism having a refractive index $n'$ with a small apex angle $2i$ and, on the other hand to a horizontal mirror forming an angle $i$ with the optical axis of the instrument, as shown by the dash and dot line $m$, $m'$ of FIG. 5, and the parallel-faced plate 32 and prism 41 are equivalent to a prism having a refractive index $n$, an apex angle C = 45° and an output face 42 inclined by an angle $-i$ to the vertical.

The total deflection produced by the compensator 29 is then the sum of a deflection $d_1$, at the point of incidence G' on face 36, of a deflection $d_2$ at points K', L' and M' constituting the input, total-reflection and outlet points, respectively, of the liquid sheet 31, and of a deflection $d_3$ at output point R' on face 42 of this compensator.

Since the angle values are small enough to assimilate their sines to these angles, in radian, the deflection $d_1$ is equal to:

$$d_1 = i \frac{n-1}{n} \quad (II)$$

The deflection $d_2$ resulting both from a reflection effect and from a refraction effect is equal to $i_1 - i_2$ wherein $i_1$ and $i_2$ are the incidence angles at points K' and M', respectively, so that it is equal to:

$$d_2 = 2i \frac{n' \cos r_1}{n \cos i_1} \quad (III)$$

wherein $r_1$ designates the refractive angle at point K', a and the deflection $d_3$ is equal to:

$$d_3 = (n-1)(d_1 + d_2 - i) \quad (IV)$$

The total deflection $d$ is thus equal to:

$$d = d_1 + d_2 + d_3 = 2in' \frac{\cos r_1}{\cos i_1} \quad (V)$$

In other words, the deflection introduced by the compensator is proportional to twice its inclination $i$ to the horizontal to the refractive index $n'$ of liquid 31 contained in cup 30 and to the ratio of the cosines of the angle of refraction and angle of incidence of the light beam respectively as it penetrates into said liquid sheet.

In the above-described example, with $i_1 = 45°$, the factor:

$$n' \frac{\cos r_1}{\cos i_1} = \sqrt{2n'^2 - n^2}$$

so that the deflection introduced by the compensator is:

$$d = 2i \quad 2n'^2 - n^2 \qquad (VI)$$

which leads to the above relationship (I), since the condition necessary and sufficient for causing the light beam refracted at R' by the outlet face 42 of prism 41 to pass through the point F of reticle 25 is written as follows:

$l \times d = f \times i.$

If, for cancelling stray aberrations and reflections, the refractive index $n'$ of the liquid sheet 31 is selected to have the same value as the refractive index $n$ of the material constituting the prism assembly 35, 41 and the parallel-faced plate 32 to avoid any deflection due to refraction, as can be obtained by mixing two properly selected liquids having one a higher refractive index and the other a lower refractive index than that of the glass constituting said prisms and said parallel-faced plate, then the above expression (I) can be written as follows:

$$l = \frac{f}{2n} \qquad (VII)$$

Thus, with a glass type BSC B 1664 manufactured by SOVIREL, which has a refractive index of 1.5165, the length $l$ of the optical path is equal to f/3.033. In other words, the compensator is so disposed that the reflection at L under the free surface of the liquid sheet contained in the cup be substantially at one-third of the focal distance of the telescopic objective as measured from the reticle, the above value being nevertheless met with precision.

Properly positioning the compensator implies that the optical path from G to F be less than ($f = e$), if $e$ designates the distance OD, i.e., that the prism 35 be not coupled directly with the lens or lenses 24, so that a gap is left therebetween.

The useful aperture of the compensator is slightly greater than one-third of the teleobjective aperture.

To take due account of the variations in the refractive index of the liquid as a function of temperature, it is contemplated according to this invention to make the refractive index of the liquid equal to that of the prism material and also of the parallel-faced plate material at an average service temperature of, say, 20°C (68°F), and to provide a screw 52 for modifying the length value $l$ of the optical path and meet the requirement corresponding to relationship (VII) hereinabove, by displacing the compensator 29 accordingly.

Let $\Delta n$ be the variation in the refractive index of liquid 31 which is due to a temperature variation. It will be seen that the variation $\Delta l$ in the length of the optical path $l$ to be brought to the compensator for correcting the effect due to the refractive index variation as a consequence a temperature change is:

$$\Delta l = -f \frac{\Delta n}{n^2}$$

which, for a medium having a refractive index approximating 1.5, for a 450 millimeter focal length and for an average temperature variation of 25°C (about 45°F) between winter and summer, to which corresponds an index variation of the order of $-1/100$, leads to a value:

$$l = \frac{450}{100} \cdot \frac{1}{2.25} = + 2 \text{ mm}$$

Another factor likely to exert an influence on the compensation effect, also due to temperature variations, is that resulting from the thermal expansion of the liquid contained in the cup 30, which is attended by a shift of the point L of total reflection under the free surface of the liquid sheet. To eliminate the systematic horizontality error due to this factor, one may either apply the operating procedure based on the equality of the front and rear bearings at each measuring station, as conventional in surveying operations, or advantageously use the means contemplated by the present invention for modifying the height of the compensator in relation to the optical axis of the sighting-piece, with the assistance of screws 51, or alrernatively mount and secure the compensator on a slideway inclined by about one degree and leaning forwards, permitting the simultaneous correction of the effect produced by variations in the refractive index as a consequence of temperature variations and of the effect caused by the thermal expansion of the liquid sheet.

Figure 7:
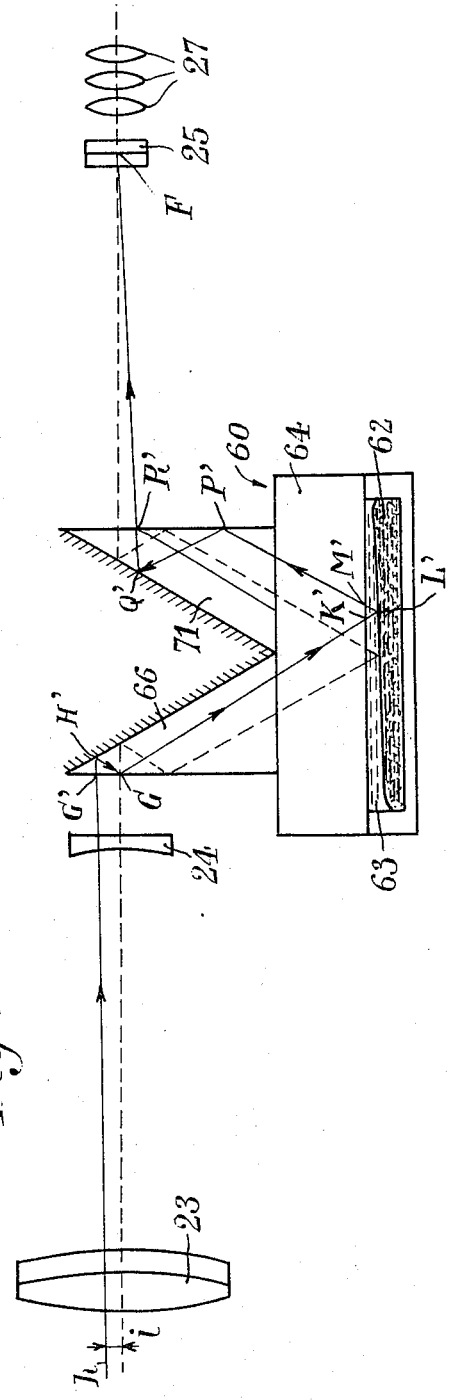
FIG. 7 is a diagram illustrating the operation of the instrument shown in FIG. 6.

Reference will now be made to FIGS. 6 and 7 illustrating another form of embodiment of the level according to this invention. In this modified construction the component elements of the instrument, outside the compensator proper, are the same as those of the preceding embodiment and designated by the same reference numerals. The compensator 60 illustrated in FIGS. 6 and 7 comprises a cup 61 containing a layer 62 of mercury covering a liquid sheet 63 having an index of refraction $n'$. This cup 61 is closed at its top by a parallel-faced plate 64 of a material having a refractive index $n$, means (not shown) being provided for allowing the free thermal expansion of the mercury 62 and liquid sheet 63 in case of temperature variations. On the top face 65 of plate 64 is a prism 66 of a material having a refractive index $n$, the light-beam inlet face 67 of this prism being perpendicular to the operative faces of plate 64. The apex angles of prism 66 are advantageously equal or close to 90°, 60° and 30°, respectively. The hypotenuse face 68 of prism 66 is reflective, for example by having a metal coating, and the same advantageously applies to the lower half of face 67. The prism edge 69 at the intersection of the hypotenuse face 68 with the face cemented to the plate 64 lies substantially in the central transverse plane of symmetry of the cup 61, and adjacent this edge 69 is one end of the edge 70 at the intersection of the dihedral or roof-shaped faces of a prism 71 similar to the prism 41 of the preceding embodiment but differing therefrom in that its section of prism 66. The prism 71 consists of a material having the same refractive index $n$ as the material constituting the prism 66 and plate 64, and is cemented to the face 65 of this plate 64, its dihedral faces being reflecting surfaces.

As in the preceding embodiment, means (not shown) are provided for adjusting the height, inclination and position of the compensator in relation to the centre F of reticle 25.

The operation of this construction (FIGS. 6 and 7) is similar to that of the preceding form of embodiment, the light beam issuing from the prism 66 being reflected by the free face of the mercury layer 62 instead of undergoing a total reflection under the free face of liquid sheet 31 of the preceding embodiment. Here, the reflecting surface constituted by the free surface of the mercury layer 62 is in an interface relationship with the constantly horizontal surface of the liquid sheet 63.

On the analogy of the above disclosure concerning the instrument illustrated in FIGS. 2 to 5, the compensator 60 of the embodiment shown in FIGS. 6 and 7 imparts to the light beam a path equivalent to that obtained by using an optical system comprising:

a prism having a refractive index $n$ and an apex angle of 30° (prism 66 and plate 64);

a prism having a refractive index $n'$ and a small apex angle $2i$, with a mirror (liquid sheet 63 and mercury layer 62), and a prism having a refractive index $n$ and an apex angle of 30° (plate 64 and prism 71).

Under these conditions, the deflection produced by the compensator is also given by the expression:

$$d = 2\, i.n' \, \frac{\cos r_1}{\cos i_1}$$

wherein $i_1$ and $r_1$ having the same meaning as given hereinabove for the preceding embodiment and with the angle $i_1 = 30°$, the deflection value is then:

$$d = 2i \sqrt{\frac{4n'^2 - n^2}{3}}$$

so that if, as in the preceding embodiment, the compensator were so mounted in the level that the lenght $l$ of $f$ the optical path from the point of reflection L on the upper face of the mercury layer 62 to the centre F of the reticle be equal (for infinity focusing) to:

$$l = \frac{f}{2\sqrt{\frac{4n'^2 - n^2}{3}}} \qquad \text{(VIII)}$$

the horizontal light beam penetrating into the sighting-piece would emerge at F notwithstanding the non-horizontality of the axis of this sighting-piece.

If the refractive index $n'$ of liquid 63 is selected to be equal to the refractive index $n$ of the material constituting the system including the plate 64 and prisms 66 and 71, the value of the deflection introduced by the compensator will be $d = 2$ in, and the leugth $l$ of the optical path from point L to the centre F of reticle 25, for which the light beam issuing from point R', FIG. 7, pass through said point F, can still be expressed as follows:

$$l = \frac{f}{2n}$$

In a manner similar to that set forth in connection with the preceding embodiment, the possibility of shifting the compensator 60 in relation to the reticle in order to take due account of local temperature conditions is contemplated.

It is proved that, for a variation $\Delta n$ of the refractive index of liquid 63, the length $l$ of the optical path must be modified by an amount.

$$\Delta l = \frac{-2}{3} f \, \frac{\Delta n}{n^2}$$

in order to obtain adequate operating conditions, this corresponding, for a refractive index approximating 1.5, for a 450 mm focal length of the teleobjective of sighting-piece 11 and for an average temperature variation of 25°C between winter and summer, involving a $-1/100$ variation of the refractive index, to an optical path variation $\Delta l = + 1.3$ mm.

Figure 8:
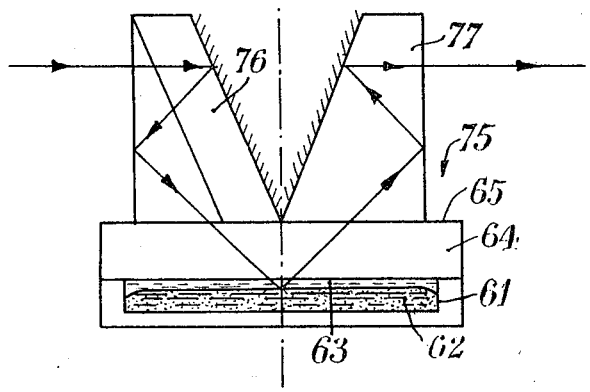
FIG. 8 is a fragmentary view showing a modified embodiment of the instrument of FIG. 6.
Figure 9:
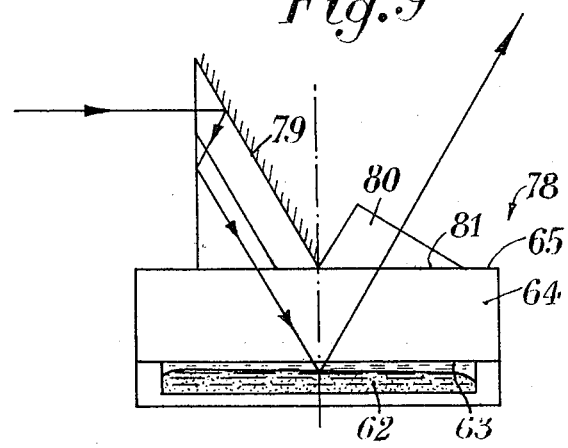
FIG. 9 is a view similar to FIG. 8 but concerning another modification.
Figure 10:
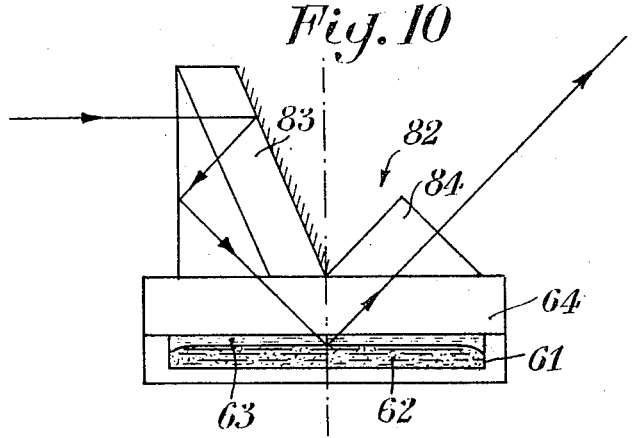
FIG. 10 is a view similar to FIGS. 8 and 9 but showing a still further modification.

FIGS. 8, 9 and 10 illustrate modified embodiments of the compensator 60. In the first case (FIG. 8) the compensator 75 comprising a cup 61 containing a mercury layer 62 covered with a liquid sheet 63 incorporates as an input element of the reflecting system a prism 76 cemented to the upper face 65 of plate 64 and similar to the prism 41 of the embodiment shown in FIG. 2, the light beam output prism 77 consisting of a prism similar to the prism 35 of the embodiment of FIG. 2.

In the alternate embodiment illustrated in FIG. 9, the reflecting system comprises, as a light-beam input prism, a prism 79 cemented to the face 65 of plate 64 and having the same characteristics as the prism 71 of the preceding embodiment ullustrated in FIG. 6. The compensator outlet comprises in this case a right-angle prism having an apex angle of 30° and a hypotenuse face 81 cemented to the face 65 of plate 64. In this modified construction the rear portion of the body of the sighting-piece of the level is set at 60° to the horizontal.

In the modified embodiment shown in FIG. 10, the compensator 82 comprises as an input element of the reflecting system associated with the cup 61 containing the mercury layer 62 and the liquid sheet 63, a prism 83 identical with the prism 76 and, as an output element, an isosceles right-angle prism 84 having its hypotenuse face cemented to the face 65 of plate 64 so that the eyepiece of the level sighting-piece is set at 45° to the horizontal.

Although a prism reflecting system has been incorporated in the compensator described hereinabove, it is clear that the present invention should not be construed as being strictily limited to this specific type of optical elements, since other systems may be used to yield the same results, notably mirror systems capable of producing an even number of reflections of the light beam between the point of penetration of the beam into the reflecting system and the liquid sheet of the compensator.

Moreover, this invention is obviously not limited by the use of a sighting piece of the type described and illustrated, i.e., comprising an objective, a divergent lens, a reticle and an eyepiece. Thus, an additional convergent lens disposed either between the objective and the divergent lens, or between the divergent lens and the compensator, or between the compensator and the reticle, may be used, this additional convergent lens being adapted to create the so-called anallatic condition permitting on the one hand of measuring without error the distance of the levelling staff pole or from the axis of orientation of the level, and therefor from the station point, with the assistance of stadiometric lines formed on the reticle, and on the other hand of obtaining a proper automatic horizontality of the sight, irrespective of the distance from the survey or levelling pole, that is, irrespective of the sighting-piece focusing which may be carried out by producing a movement of translation either of the divergent lens or of the convergent lens.

What is claimed as new is:

1. An optical sighting instrument comprising a sighting-piece including a teleobjective, a reticle and an eyepiece, and a device for compensating the non-horizontality of the instrument, said compensating device comprising a liquid sheet having a surface remaining constantly horizontal, and a reflecting system associated with said sheet and adapted to impart to an incident light beam, between the point of penetration thereof into the reflecting system and said liquid sheet, an even number of reflections, whereby said light beam, after passing a first time through said liquid sheet, is caused to pass again therethrough subsequent to a total reflection at a point of said permanently horizontal surface of said liquid sheet, and said compensating device being so disposed between said teleobjective and said reticle, that the length $l$ of the optical path from the center of said reticle to the point of total reflection of the light beam on the permanently horizontal surface of said liquid sheet is equal, for infinity focusing, to $f/x$, $f$ designating the focal length of the telobjective and $x$ a constant depending on the refractive indices of said liquid and of said material constituting said reflecting system, and also on the geometrical arrangement of said compensating device.

2. An optical sighting instrument as set forth in claim 1, wherein the liquid sheet and the material of the reflecting system have refractive indices of the same value, and wherein $l = f/2n$, $n$ designating the common value of the refractive index of said liquid sheet and of the refractive index of the material constituting said reflecting system.

3. An optical sighting instrument as set forth in claim 1, wherein said teleobjective and said eyepiece are aligned on a common axis, whereby said sighting-piece has a substantially rectilinear body.

4. An optical sighting instrument as set forth in claim 1, which further comprises means for adjusting the position of said compensating device in relation to the center of said reticle.

5. An optical sighting instrument as set forth in claim 1, further comprising means for adjusting the vertical and angular position of said compensating device in relation to the component elements of said sighting-piece.

6. An optical sighting instrument as set forth in claim 1, further comprising means for rotating the compensator through half a revolution about a vertical axis of symmetry thereof.

7. An optical sighting instrument as set forth in claim 1, further comprising an anallatism lens for maintaining automatically the horizontality of the instrument irrespective of the focusing length of the sighting-piece.

* * * * *